(12) United States Patent
Badger et al.

(10) Patent No.: US 10,810,610 B2
(45) Date of Patent: Oct. 20, 2020

(54) SYSTEMS AND METHODS FOR CONSUMER LOYALTY MANAGEMENT

(71) Applicant: Worldpay, LLC, Symmes Township, OH (US)

(72) Inventors: Brent Alan Badger, Powell, OH (US); Jacob Matthew Sterling, Creve Coeur, MO (US)

(73) Assignee: Worldpay, LLC, Symmes Township, OH (US)

( * ) Notice: Subject to any disclaimer, the term of this patent is extended or adjusted under 35 U.S.C. 154(b) by 806 days.

(21) Appl. No.: 14/751,336

(22) Filed: Jun. 26, 2015

(65) Prior Publication Data

US 2016/0379241 A1 Dec. 29, 2016

(51) Int. Cl.
*G06Q 30/02* (2012.01)

(52) U.S. Cl.
CPC ................................ *G06Q 30/0226* (2013.01)

(58) Field of Classification Search
CPC .................................................. G06Q 30/0226
See application file for complete search history.

(56) References Cited

U.S. PATENT DOCUMENTS

| 2006/0053056 | A1* | 3/2006 | Alspach-Goss et al. | ........ 705/14 |
| 2013/0311286 | A1* | 5/2013 | Detwiler et al. | ................. 705/14 |
| 2015/0106263 | A1* | 4/2015 | Linden | .................... G06Q 20/06 705/44 |
| 2016/0098742 | A1* | 4/2016 | Minicucci et al. | ............. 705/14 |

OTHER PUBLICATIONS

A. Bilgihan. Gen Y customer loyalty in online shopping: An integrated model of trust, user experience and branding. Computers in Human Behavior, vol. 61, Aug. 2016, pp. 103-113. (Year: 2016).*

\* cited by examiner

*Primary Examiner* — William A Brandenburg
*Assistant Examiner* — Christopher C Busch
(74) *Attorney, Agent, or Firm* — Bookoff McAndrews, PLLC

(57) ABSTRACT

Technologies for providing consumer loyalty to merchants are provided. Payment transactions are monitored based on communications received from point of sale systems of merchants. Based on loyalty-based rules for the merchant, the purchase transaction can be modified to provide a stored benefit to the consumer. Tracking loyalty-based activity based on payment transactions can reduce the necessity for consumer involvement or registration with a merchant's loyalty program while increasing a merchant's ability to provide the consumer in meaningful marketing engagements.

19 Claims, 8 Drawing Sheets

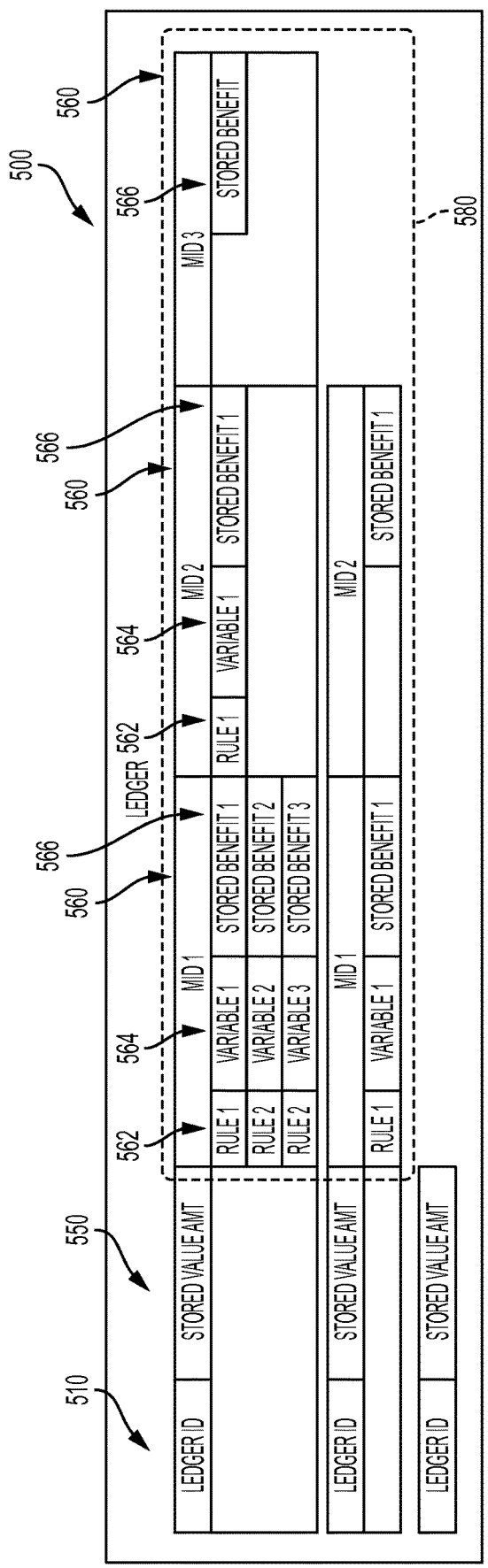

SYSTEMS AND METHODS FOR CONSUMER LOYALTY MANAGEMENT

BACKGROUND

Loyalty programs are typically structured marketing efforts that reward and encourage loyal buying behavior. Loyalty programs are typically unique to a single merchant or a fixed plurality of merchants. While a vendor or platform for loyalty programs may host multiple programs, each program is still typically only associated with a sole merchant, thereby limiting the loyalty-based tracking and rewards facilitated through the program. A registration or enrollment process is typically required with customers providing their personal information in exchange for a unique identifier, such as a numerical ID or membership card. This unique identifier is then presented by the customer when making a purchase so that the purchase can be tracked, and sometimes rewarded, by the company. The efficacy of the loyalty program, however, can depend on whether the company is able to successfully and accurately register customers and then the registered customers routinely provide their unique identifier at the time of a purchase. Moreover, the formation and management of loyalty programs typically depend on the ability of the merchant to set up and manage a program, from a technological perspective and an operational perspective. Thus, there is a need to enhance the marketing engagement between merchants and customers, while reducing participation requirements from the customer-side and the merchant-side.

BRIEF DESCRIPTION OF THE DRAWINGS

FIGS. 5-8 schematically depict various simplified ledger schemas in accordance with non-limiting embodiments.

DETAILED DESCRIPTION

Figure 1:
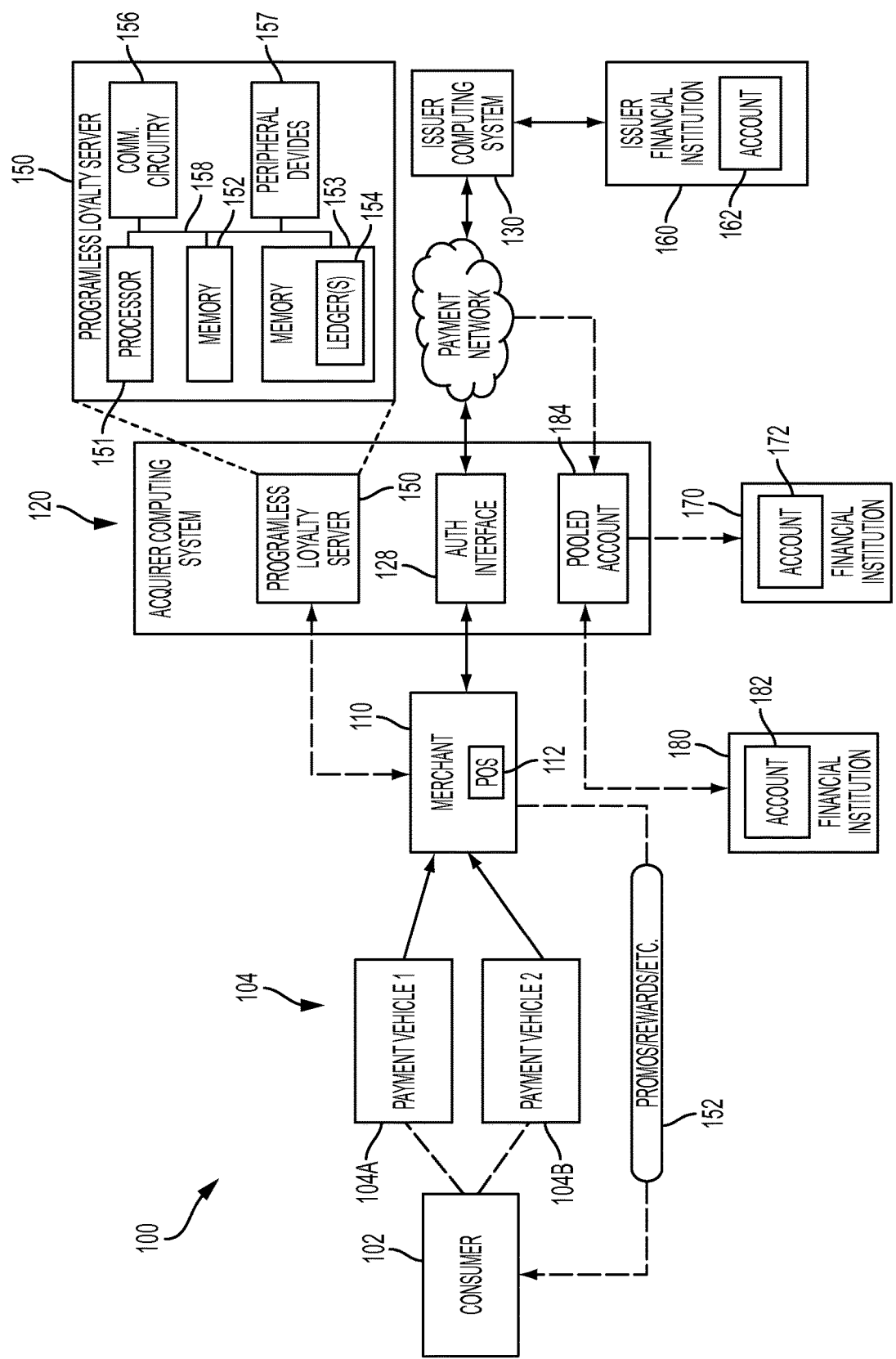
FIG. 1 depicts a block diagram of an example consumer loyalty management system.

Various non-limiting embodiments of the present disclosure will now be described to provide an overall understanding of the principles of the structure, function, and use of systems and methods disclosed herein for consumer loyalty management. One or more examples of these non-limiting embodiments are illustrated in the selected examples disclosed and described in detail with reference made to FIGS. 1-8 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

FIG. 1 depicts a block diagram of an example consumer loyalty management system 100. The system comprises an acquirer computing system 120 that is configured to communicate point of sale (POS) systems 112 and communicate with one or more payment networks and issuer computing systems. For convenience, only one POS system 112 and one issuer computing system 130 is shown. Moreover, as used herein, the term POS system is used broadly to include POS system at brick and mortar locations and "virtual" POS system that can be associated with an online retailer or "in-app" purchases. In some cases, the POS system includes a terminal, or other network computing system which may be used to facilitate a payment transaction at a merchant location. The POS system 112 is affiliated with a merchant 110. The term merchant, as used herein, refers generally to any type of retailer, service provider, or any other type of business that is in networked communication with the acquirer computing system 120 and uses the payment processing services of the acquirer computing system 120. Payment processing services can include receiving and responding to authorization requests as well as facilitating the settlement of funds associated with card-based transactions occurring at the merchant 110.

In accordance with some embodiments, POS system 112 can generally be unmodified and simply facilitate the transmission of transaction-related information to the acquirer computing system 120, as is known in the art. The transaction-related information can comprise an authorization request as well as other types of identifying indicia. The identifying indicia can vary based on POS system 112, the type of merchant and the type of transaction, but example types of identifying indicia can include any of the following: a merchant identification (MID) identifier, a loyalty program identifier, a bank identification (BIN) identifier; a merchant category code (MCC) identifier; a media access control (MAC) identifier; an internet protocol (IP) identifier; a geographic identifier; a payment type identifier; and/or a consumer name or other consumer identifier.

A consumer 102, sometimes referred to as a cardholder or card member, can provide information from a payment vehicle 104 to the POS system 112 to initiate a transaction with the merchant 110. In some cases, the consumer 102 may use a computing device (not shown) to initiate the transaction, such as for a card-not-present transaction at an online merchant. As schematically illustrated, some consumers can have multiple payment vehicles 104A, 104B which can be selectively used by the consumer to initiate a payment transaction at the merchant 110. While two payment vehicles 104A, 104B are illustrated, consumer 102 can be affiliated with any suitable number of different payment vehicles, which may or may not be issued by the same financial institution. Furthermore, as described in more detail below, a particular payment vehicle can be deemed affiliated with any suitable number of consumers. Unless otherwise specified herein, "payment vehicle" includes a physical card including a plastic or paper card with a magnetic stripe, bar code or other indicator indicative of an account number or other account indicative information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. Data associated with the card can include an encrypted or unencrypted account number or other encrypted or unencrypted account indicative information and/or encrypted or unencrypted information associated with a particular client, issuer, creator or group of merchants. It is also contemplated that the payment vehicle can have multiple embodiments or forms. For example, the payment vehicle can be a physical card (e.g., in the form of magnetic striped plastic card), a virtual card (e.g., in the form of a display on a smart phone), or both. The virtual card can be communicated by displaying a display or screen shot, and/or by transmitting a signal, such as by using NFC (Near Field Communication) technology or other secure transport technologies to complete the transaction with the selected merchants. Optionally, the virtual card can have a display element (e.g., a bar code or string of numbers) which identifies the account number associated with the card. Alternatively, the virtual card can have display elements relating to the merchants which accept the card. Thus, whether the payment vehicle is physical or virtual, it communicates account information.

In accordance with the present disclosure, the acquirer computing system 120 can also comprise a consumer loyalty server 150 that can comprise one or more processor and instructions stored in memory. In some embodiments, the consumer loyalty server 150 can provide an interface 140 that is accessible by various entities via a suitable computing device 154 (see e.g., FIG. 2A-2C). As shown, the merchant 110 can interface with the consumer loyalty server 150. In other embodiments, however, other entities such as marketing partners, analytics providers, among others, can interface with the consumer loyalty server 150. The particular implementation of the interface 140 can vary, but in some example embodiments, the interface 140 is a webpage that allows a loyalty server to input parameters, review previously provide parameters, select predesigned promotions, view existing promotions, define market segmentations, define benefits, associate payment vehicles, disassociate payment vehicles, receiving reporting, and so forth.

The consumer loyalty server 150 can provide or otherwise identify one or more promotions or stored benefits that can be applied to various transactions or otherwise configure loyalty-based tracking and management. As described in more detail below, the consumer loyalty server 150 can generally provide loyalty management services across a plurality of merchants and a plurality of consumers. In some cases, the loyalty management services provided by the consumer loyalty server 150 are referred to as programless consumer loyalty management services, open consumer loyalty management services, or universal consumer loyalty management services. In any event, the consumer loyalty server 150 can generally allow a plurality of merchants to participate in and offer loyalty-based services to their consumers without necessarily having to host, support, or manage the technology necessary for such an offering. Furthermore, since the consumer loyalty server 150 can have visibility into a consumer's behavior across a plurality of merchants, and based on a plurality of different payment vehicles, the types of loyalty-based tracking and offerings available through the services of consumer loyalty server 150 can provide merchants with a large amount of flexibility and insight when seeking to generate consumer loyalty. In some embodiments, as described in more detail below, the consumer loyalty server 150 can collect non-purchase behavioral information from sources beyond financial transactions. This additional non-purchase behavioral information can be used by the consumer loyalty server 150 to further augment the loyalty-based offerings that can be provided to consumers or segmentations of consumers by merchants or combinations of merchants.

While shown to be part of the acquirer computing system 120 in FIG. 1, the consumer loyalty server 150 can be associated with, for example, the merchant 110, the POS system 112, the issuer financial institution 160, the issuer computing system 130, the payment network, or any other third party, such as a marketing entity. As described in more detail below, the parameters and type of loyalty-based tracking and application of stored benefits can vary, but in some examples the loyalty-based tracking comprises a segment definition that defines the customer base to which the stored benefit is applicable. Generally, a segment definition can set the rules for determining how and when a stored benefit should be applied to a transaction and who the stored benefit should be provided to. Segment definitions can be based on a variety of parameters, including purchase-related behavior and non-purchase-related behavior or attributes. By way of example, if a consumer frequents a particular merchant above a certain threshold of visits in a time period, they can be placed in a certain segment. By comparison, a consumer identified as likely to attrite can be placed in a different segment. Non-purchase related data obtained for consumers can also be helpful to segmentize the consumer. If a consumer recently moved, for example, the consumer can be placed in a certain segment so they receive stored benefits helpful to them. In some embodiments, the stored benefit can be linked to a particular payment vehicle of a cardholder (i.e. based on account information) or the stored benefit can be more broadly linked to the consumer 102 and apply across a variety of payment vehicles associated with the consumer 102. In some embodiments, the stored benefit can be linked to other identifying information of a cardholder (i.e. an email address, a shipping address, an IP address, a user ID, and so forth). The data regarding the stored benefit can be stored in one or more database 146.

Referring still to the acquirer computing system 120, subsequent to receiving parameters for the application of one or more stored benefits, an authorization interface 128 can receive a first authorization request from the POS system 112. The first authorization request can comprises various data, including, for example, a MID, a MCC, an account identifier, and a first transaction amount. In some embodiments, other consumer-identification related data can be received, such as an email address, an IP address, and so forth. Once the authorization request is received, the consumer loyalty server 150 can determine if certain actions should take place, such as determining whether any stored benefits are applicable to the first authorization request. The determination can be based on any number of factors, inputs, or parameters, as described in more detail below. In one example, for example, it is determined if the consumer 102 and the merchant 110 is within the segment definition of a particular stored benefit. As used herein a stored benefit can be any type of value provided to the consumer 102, such as, without limitation, a discount (i.e., $2.00 off, or 10% off), a product offering (i.e., 2 for the price of 1), a complementary product (i.e., free meal), or any other transfer of value based on consumer behavior. In some embodiments, due to the engagement of consumer loyalty server 150 with a plurality of merchants, co-branded or co-marketed offerings can be provided to various consumers. By way of example, purchase and/or non-purchase behavior can be tracked by the consumer loyalty server 150 and when certain conditions are satisfied, a stored benefit redeemable at a plurality of merchants can be provided to the consumer (i.e., dinner at a first merchant and a movie at a second merchant). As is to be appreciated, a wide variety of stored benefits can be provided to a consumer without departing from the scope of the present disclosure Additionally or alternatively, the consumer loyalty server 150 can track behavior over time through the indexing of various variables or storing of certain information regarding the purchasing behavior of the consumer 102. Just by way of example, the consumer loyalty server 150 could track the amount spent at a merchant over a time period, the types of payment vehicles used by the consumer and/or the goods or services purchased by the consumer (i.e., based on SKU data). In some embodiments, the consumer loyalty server 150 can perform its function without needing the consumer 102 to enroll or otherwise register with a loyalty program. In some embodiments, the consumer loyalty server 150 can perform its function without needing the consumer 102 present any type of unique identifier at the POS system 112, beyond the payment vehicle used to initiate the purchase, or other type of identifier (such as email address, IP address, etc.).

Still referring to FIG. 1, when a stored benefit is not applicable to the first authorization request, the acquirer computing system 120 can transmit an authorization request through the payment network to an issuer computing system 130, using conventional messaging. The authorization request provided to the payment network from the acquirer computing system 120 can identify the same amount of funds that was provided in the authorization request originally received from the POS system 112. By comparison, when a stored benefit is applicable to the first authorization request, in some embodiments, the acquirer computing system 120 can modify the authorization request to generate an augmented authorization request. It is the augmented authorization request that is provided to the payment network and other entities within the payment ecosystem. The particular modification to any authorization request can be based on the terms of the stored benefit deemed to be applicable to the transaction. In one example, the stored benefit is a pricing discount such that the amount of funds that is requested by the acquirer computing system 120 from the issuer computing system 130 is less than the amount of funds originally requested from the POS system 112. For example, the amount of funds identified in the first authorization request may be reduced by a particular percentage or may be reduced by a particular dollar amount to determine the amount to be identified in the second authorization request. In this fashion, since the stored benefit can be applied with the payment stream, the application of the stored benefit and augmentation of the terms of the authorization requests are generally transparent to entities both downstream of the acquirer computing system 120 (i.e. the POS system 112) and entities upstream of the acquirer computing system 120 (i.e. the payment network and the issuer computing system 130). From the consumer perspective, a stored benefit 152 can be provided by the merchant 110 at the time of purchase, thereby seeking to engender consumer loyalty.

In conventional fashion, the issuer processor system 130 can respond to the modified authorization request with an approval, a denial, or other suitable type of response. The acquirer computing system 120 can, in turn, provide a response to the POS system 112. In the case of an authorization approval, the amount identified in the authorization response from the acquirer computing system 120 can be lower than the amount of funds originally sought to be authorized by the POS system 112, due to the application of the stored benefit. Therefore, additional messaging can be provided by the acquirer computing system 120 to the POS system 112 to resolve that discrepancy and allow the POS system 112 to complete the transaction. Moreover, appropriate tracking or reporting can be performed such that the loyalty profile of the consumer is updated to reflect the purchase event.

Subsequent to a successful financial transaction at the merchant 110, a settlement event can eventually occur that generally transfers funds from the account 162 that is linked to the payment vehicle 104 to at least an account 172 linked to the acquirer computing system 120 and an account 182 linked to the merchant 110. The accounts 172, 182 can each be maintained by financial institutions 170, 180, respectively, as schematically shown in FIG. 1. As indicated by the dashed lines on FIG. 1, settled funds can be routed from the payment network to a pooled account 184 of the acquirer computing system 120. Various processing fees and charges can be transferred into the acquirer account 172. These fees can be based on the costs of the acquiring the transaction on behalf of the merchant 110, and if a stored benefit was applicable or additional tracking/monitoring performed, additional fees can be levied by the acquirer computing system 120 based on the costs of the programless loyalty management services. The remainder of the funds can be settled to the merchant account 182, or any other suitable account. The settlement process described above is sometimes referred to herein as a net settlement process.

The consumer loyalty server 150 can be embodied as any type of server or computing device capable of processing, communicating, storing, maintaining, and transferring data. For example, the consumer loyalty server 150 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the consumer loyalty server 150 can be embodied as a computing device integrated with other systems or subsystems. In the illustrative embodiment of FIG. 1, the consumer loyalty server 150 includes a processor 151, a system bus 158, a memory 152, a data storage 153, communication circuitry 156, and one or more peripheral devices 157. Of course, the consumer loyalty server 150 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 152, or portions thereof, can be incorporated in the processor 151 in some embodiments. Furthermore, it should be appreciated that the consumer loyalty server 150 can include other components, sub-components, and devices commonly found in a computer and/or computing device, which are not illustrated in FIG. 1 for clarity of the description.

The processor 151 can be embodied as any type of processor capable of performing the functions described herein. For example, the processor 151 can be embodied as a single or multi-core processor, a digital signal processor, a microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the consumer loyalty server 150 includes a system bus 158 for interconnecting the various components of the consumer loyalty server 150. The system bus 158 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 151, the memory 152, and other components of the consumer loyalty server 150. In some embodiments, the consumer loyalty server 150 can be integrated into one or more chips such as a programmable logic device or an application specific integrated circuit (ASIC). In such embodiments, the system bus 158 can form a portion of a system-on-a-chip (SoC) and be incorporated, along with the processor 151, the memory 152, and other components of the consumer loyalty server 150, on a single integrated circuit chip.

The memory 152 can be embodied as any type of volatile or non-volatile memory or data storage capable of performing the functions described herein. For example, the memory 152 can be embodied as read only memory (ROM), random access memory (RAM), cache memory associated with the processor 151, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory 152 can store various data and software used during operation of the consumer loyalty server 150 such as operating systems, applications, programs, libraries, and drivers.

The data storage 153 can be embodied as any type of device or devices configured for short-term or long-term storage of data such as, for example, memory devices and circuits, memory cards, hard disk drives, solid-state drives, or other data storage devices. For example, in some embodiments, the data storage 153 includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 151, or the memory 152 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage 153 includes ledger(s) 154. The ledger(s) 154 can include transaction data (e.g., payment card numbers, transaction amount data, etc.) and cardholder-specific data (e.g., cardholder identifiers such as electronic mail addresses, IP addresses mailing addresses, marketing preferences, etc.), which can be captured and received from the merchant POS system 112 or any other device or system, as well as loyalty-centric rules, variables, and stored benefits. It should be appreciated that some or all of the cardholder data can be encrypted, tokenized, or otherwise secured. In some embodiment, anonymized consumer segmentations are utilized to reduce the need to store personally identifiable information.

The communication circuitry 156 of the consumer loyalty server 150 may be embodied as any type of communication circuit, device, interface, or collection thereof, capable of enabling communications between the consumer loyalty server 150 and the merchant 110, merchant POS system 112, an authentication interface 128 of the acquirer processor 120, other computing devices of the system 100, and/or any other computing device communicatively coupled thereto. For example, the communication circuitry 156 may be embodied as one or more network interface controllers (NICs), in some embodiments. The communication circuitry 156 may be configured to use any one or more communication technologies (e.g., wireless or wired communications) and associated protocols (e.g., Ethernet, Wi-Fi®, WiMAX, etc.) to effect such communication.

In some embodiments, the consumer loyalty server 150 can communicate with each one or more entities other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100.

Additionally, in some embodiments, the consumer loyalty server 150 can further include one or more peripheral devices 157. Such peripheral devices 157 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In some embodiments, the consumer loyalty server 150 establishes an environment during operation. The environment can include various modules, components, sub-components, and devices commonly found in computing devices, which are not illustrated in the figures for clarity of the description. The various modules, components, sub-components, and devices of the environment can be embodied as hardware, firmware, software, or a combination thereof. For example, one or more of the modules, components, sub-components, and devices of the environment can be embodied as a processor and/or a controller configured to provide the functionality described herein.

Figure 2A:
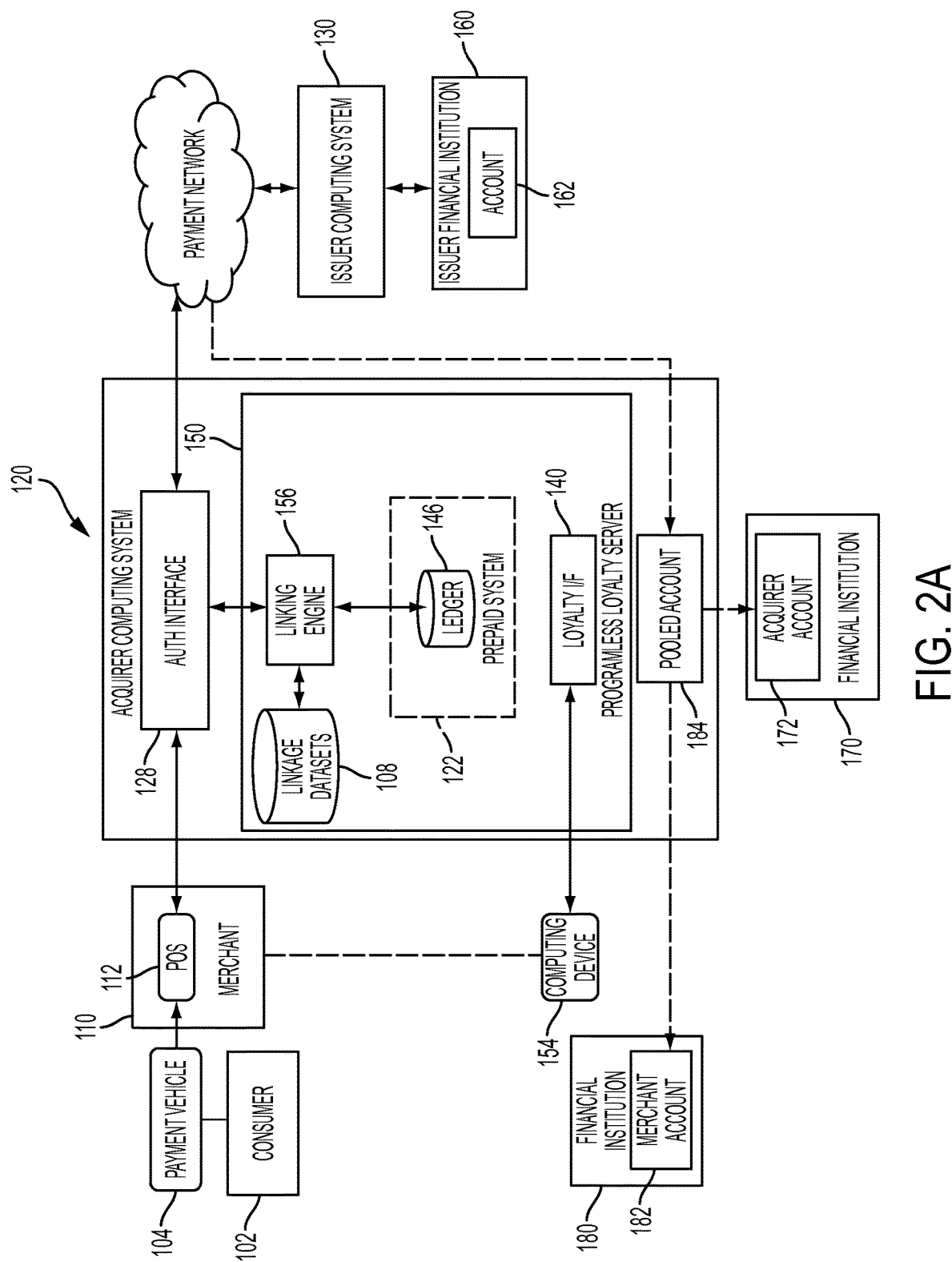
FIGS. 2A-2C depict block diagrams of example consumer loyalty management systems.

FIG. 2A depicts a block diagram of another example consumer loyalty management system. In this example embodiment, the consumer loyalty server 150 is schematically shown to include a data store of linked datasets 108, a linking engine 156, a prepaid system 122, and a loyalty interface 140. The prepaid system 122 can include, for example, the functionality of the acquirer computing system 120 that facilitates the management and processing of prepaid payment vehicles. In general, conventional prepaid systems can track particular prepaid payment vehicles and an amount of stored value associated with each prepaid payment vehicle. When an authorization request is received by the acquirer computing system 120 for a transaction using a prepaid payment vehicle, the prepaid system 122 can determine whether the prepaid payment vehicle is "loaded" with sufficient funds to complete the transaction. As is understood by those skilled in the art, this tracking can be facilitated through the use of one or more ledgers, data stores, databases, etc. A single ledger 146 is illustrated in FIG. 2A for clarity.

In accordance with some embodiments, the program loyalty server 150 can utilize the ledger 146 of the prepaid system 122 to provide various functionalities associated with customer loyalty. For example, the ledger 146 can include the fields associated with a conventional prepaid system, but also include extended fields to facilitate the programless loyalty functionality described herein. In some embodiments, the ledger 146 can store a plurality of ledger IDs. Each ledger ID can be associated with a consumer as well as a stored value amount, a stored benefit, and a variety of other variables or data fields as may be beneficial for consumer tracking and rewarding. Example schemas for the ledger 146 are described in more detail below.

The linked datasets 108 can generally associate a payment vehicle 104 (or other consumer identifier) to the ledger 146, such as via a ledger ID. In other words, the linked datasets 108 can serve as the bridge between payment vehicles that may be used by a consumer to particular loyalty-based data that is maintained in the prepaid system 122. In some embodiments, the linked datasets 108 are stored within the ledger 146. The linking engine 156 can create the links that are stored in the linked datasets 108 as well as query the linked datasets 108 for existing links for incoming authorization requests, as described in more detail below.

Figure 2B:
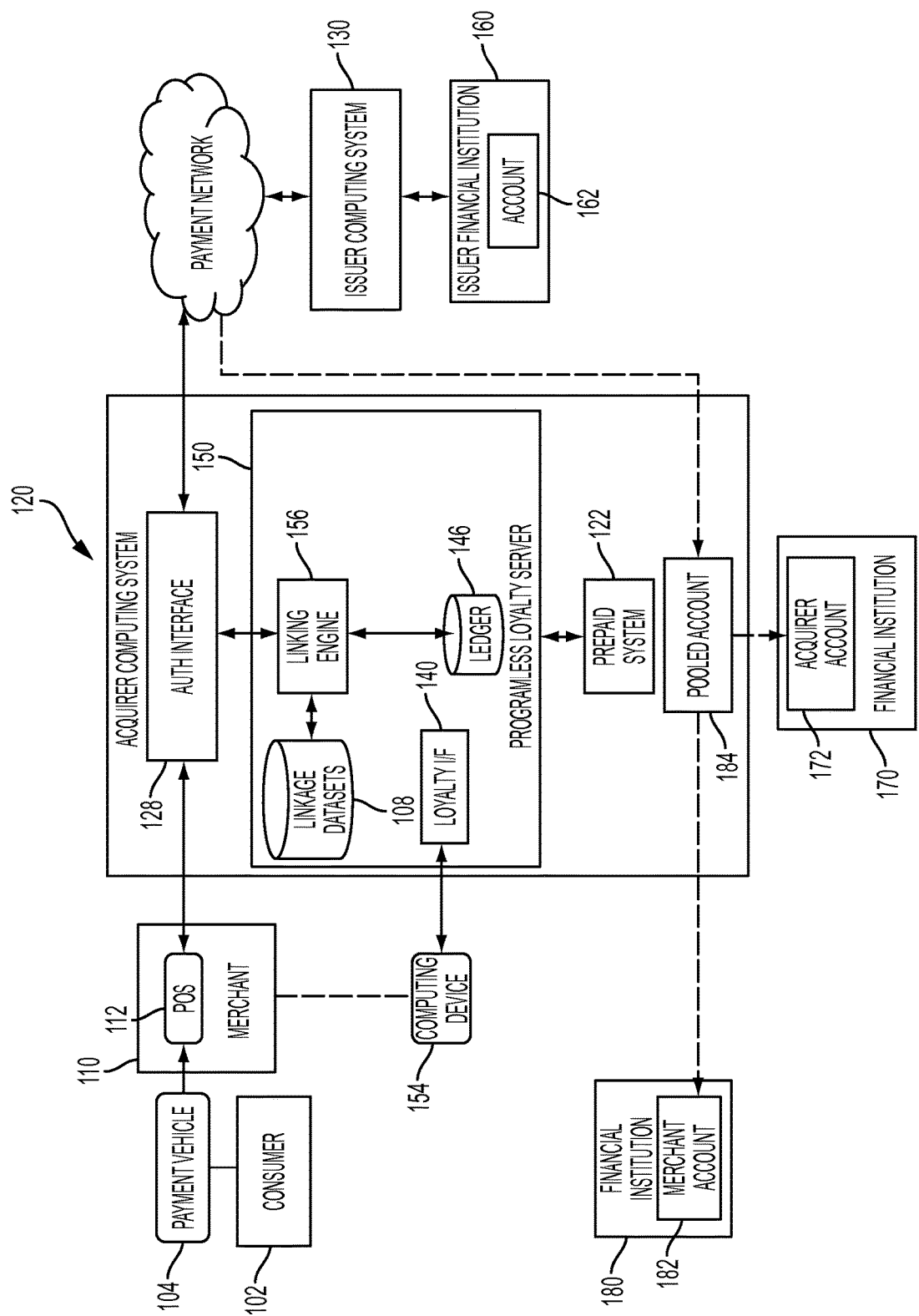
Figure 2C:
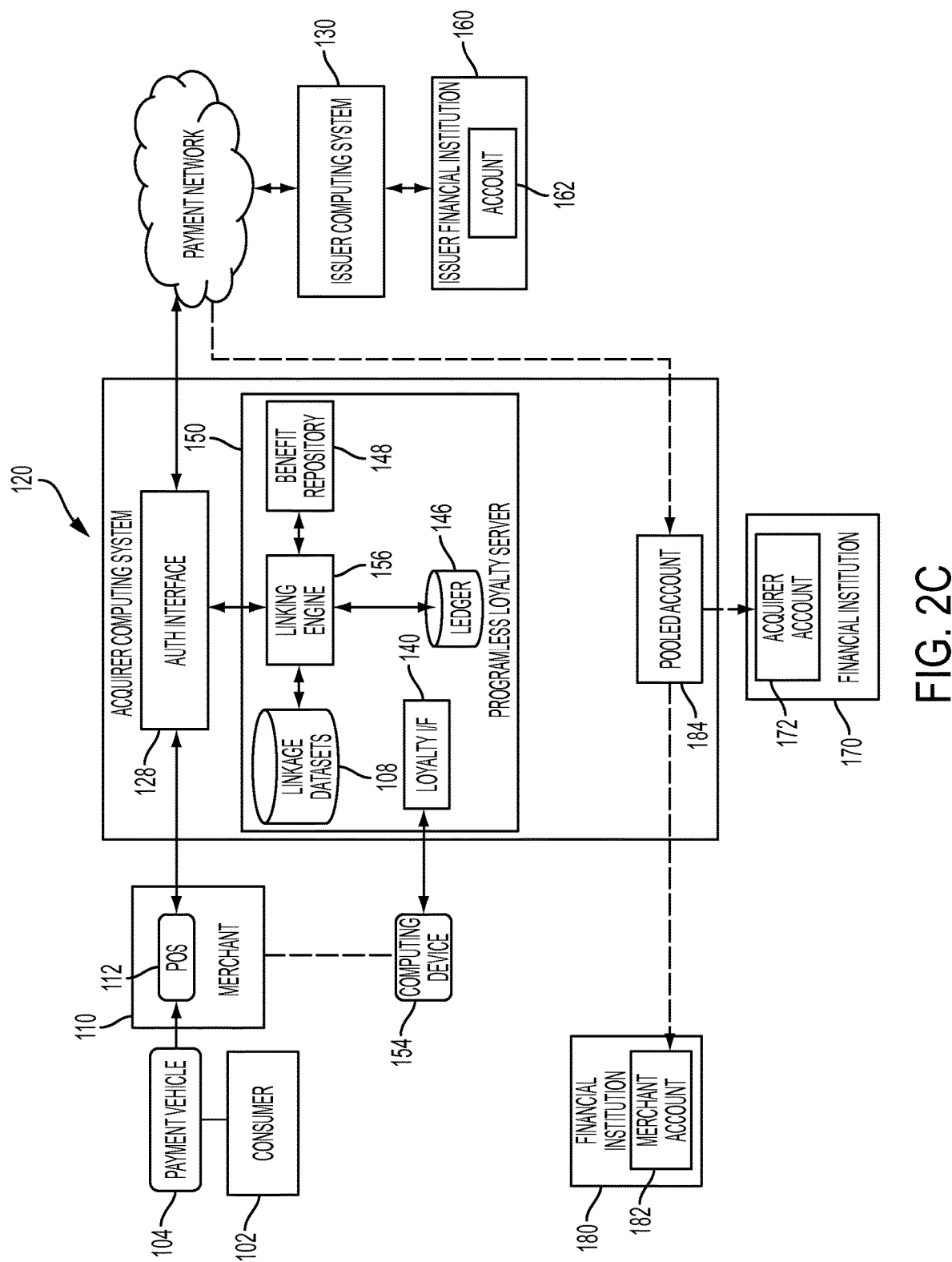

While FIG. 2A depicts the use of a ledger of a prepaid system, other system topologies can be used, such as schematically illustrated in FIGS. 2B-2C. Referring to FIG. 2B, the ledger 146 is independent from the prepaid system 122. However, the prepaid system 112 is still utilized as a vehicle to maintained stored benefits that can be utilized by the consumer loyalty server 150. Referring to FIG. 2C, the ledger 146 is independent from the prepaid system 122 and the consumer loyalty server 150 includes a store benefit repository 148. Therefore, in this example embodiment, a prepaid system is not utilized by the consumer loyalty server 150.

Figure 3:
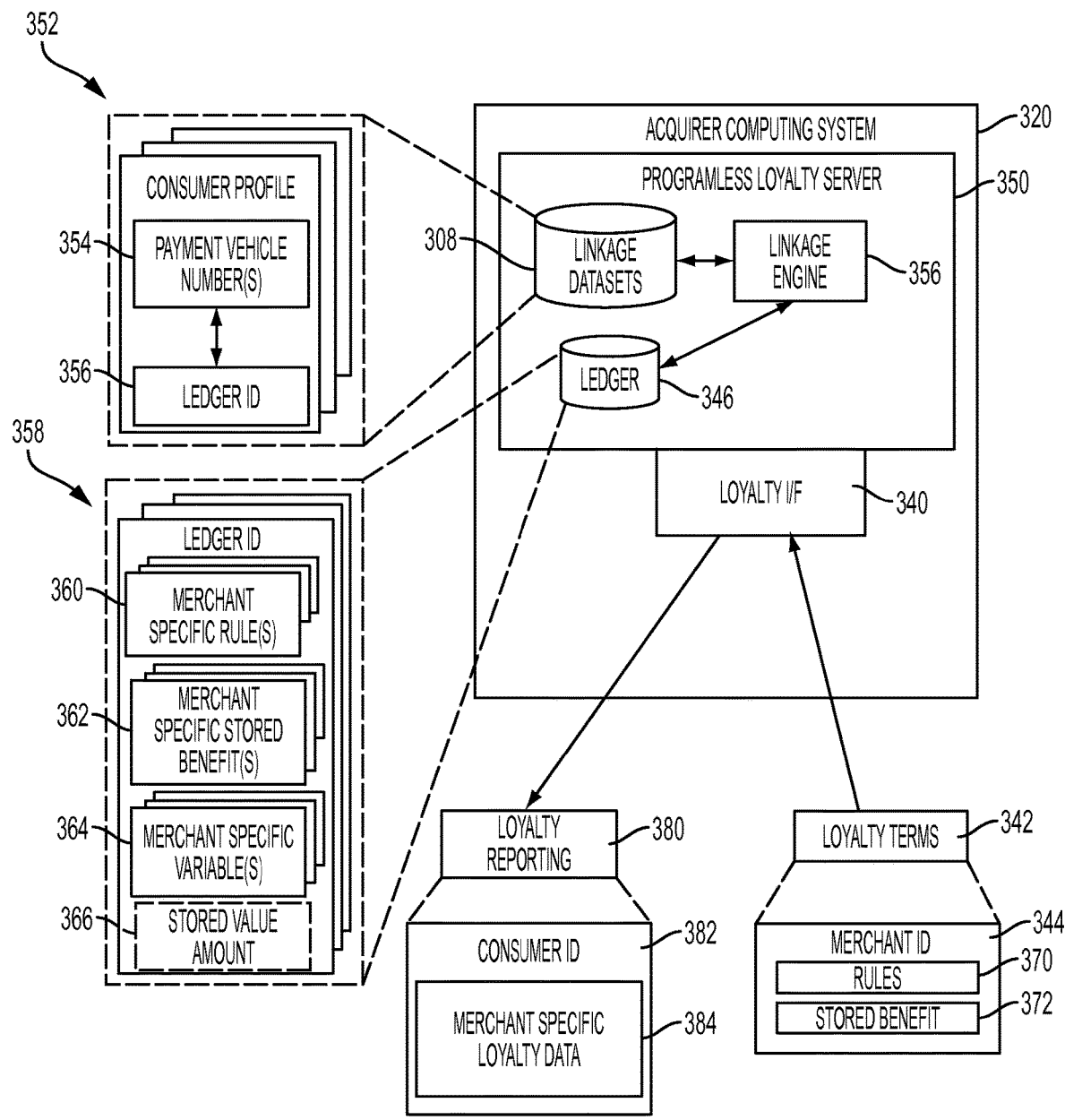
FIG. 3 depicts an example acquirer computing system having a consumer loyalty server in accordance with one non-limiting embodiment.

FIG. 3 depicts an example acquirer computing system 320 having a consumer loyalty server 350 in accordance with one non-limiting embodiment. The linkage datasets 308 are shown to schematically include a plurality of different consumer profiles 352. Each consumer profile 352 can include, for example, payment vehicle number(s) 354 that are linked to a ledger ID 356. While payment vehicle number(s) are depicted in FIG. 3, any suitable identifier or tracking element can be used, such as IP address, email address, shipping address, etc. In some embodiments, the linking engine 356 facilitates the association of the payment vehicle number(s) 354 to a ledger ID 356 for each consumer profile 352. In some embodiments, the linkage datasets can link consumer segmentations to ledger IDs. Accordingly, consumers falling into certain segmentations can be offered loyalty-based rewards that differ from the loyalty-based rewards offered to other consumer segmentations. The linking engine 356 can also query the linkage datasets 308 upon receiving an authorization request from a merchant to determine if a ledger ID is associated with the particular consumer identified in the authorization request.

The ledger 346 is schematically shown to include a plurality of variables and other information that is stored for each ledger ID 358. For example, associated with each ledger ID 358 can be merchant specific rule(s) 360, merchant specific stored benefit(s) 362, and merchant specific variable(s) 364. If the ledger 346 also serves as a repository for stored value, such as being a component of a prepaid system, the ledger ID 358 can also include a stored value amount 366. A merchant specific rule 360 can be set to trigger an action based on, for example, a purchase amount, a purchase location, a type of purchase, a number of purchases, or any other suitable purchase or consumer activity. A merchant specific stored benefit 362 can include, for example, a discount percentage, a discount amount, a promotional offering, or other stored benefit. A merchant specific variable 364 can be, for example, any variable that is used to track certain purchase events or activity, such as number of purchases within a time period, average spend, average time between spend, or any other variable that may be valuable in assessing consumer loyalty or consumer spend activity. A stored value about 366 can be an amount of funds that is associated with the ledger ID 358 and accessible through use of an associated stored value payment vehicle.

As illustrated, a loyalty interface 340 can be utilized to by an entity to provide information to the consumer loyalty server 350 and to retrieve information from the consumer loyalty server 350. In some embodiments, a computing device 154 (FIGS. 2A-2C) can be used to access the loyalty interface 340. The loyalty interface 340 can be facilitated through any suitable means, such as a web portal, an API, a specialized application, and so forth. Loyalty terms 342 can be provided to the consumer loyalty server 350 in order to create customized loyalty programs. The loyalty program can be tied to any suitable base events, such as purchase activity at a merchant, at a collection or grouping of merchants, or use of a particular brand of payment vehicle, for example. In some embodiments, the loyalty terms 342 can include a merchant ID 344 (such as a MID), as well as rules 370 and stored benefits 372. The rules 370 and the stored benefits 372 can be logged into the ledger 346. By way of example, a particular merchant may wish to reward consumers who spend a certain amount within a certain period of time. The reward (i.e., stored benefit) is an instant 5% coupon. Through the loyalty interface 340, the merchant can be identified and a rule can be established for the promotion. The parameters of the promotion can be stored within the ledger 346, such that when consumers make a purchase at the merchant, if they are identified in the linkage datasets 308, and if the purchase satisfies the rule, the instant 5% coupon will be applied to the transaction.

Figure 4:
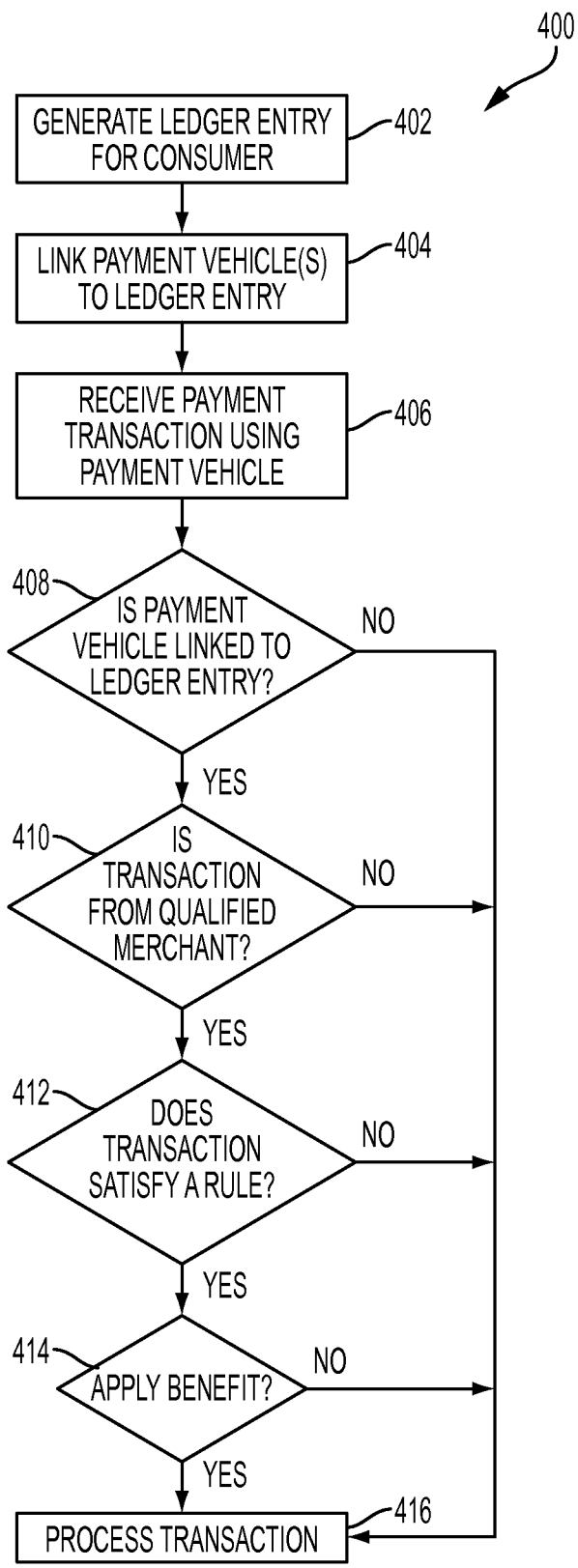
FIG. 4 is a flow chart depicting an example process executed by a consumer loyalty server.

Referring now to FIG. 4, a method 400 that may be executed by a consumer loyalty server begins with block 402. At block 402, a ledger entry is generated for a consumer in a ledger. As described above, the ledger can be, for example, a ledger associated with a prepaid system or an independent ledger. At block 404, one or more payment vehicles associated with a consumer are linked to the ledger entry. In some embodiments, a ledger entry can be associated with a plurality of consumers, such as consumers identified to be members of the same household, for example. At block 406, a payment transaction is received that identifies a payment vehicle. As it to be appreciated, in other implementations, different consumer identification techniques may be used, such as identifying based on IP address, MAC address, email address, etc. At block 408, the consumer loyalty server determines if the payment vehicle identified in the payment transaction is linked to any of the ledger entries. If the payment vehicle is not linked to a ledger entry, the process can loop forward to block 416 to resume standard processing. If the consumer loyalty server determines that the payment vehicle is linked to a ledger entry, the process can determine at block 410 if the transaction is from a qualified merchant. As used herein, qualified merchant can includes merchants that are merchants that are utilizing the consumer loyalty server to facilitate a loyalty program. Such qualified merchants can be identified based on a MID received as part of the payment transaction messaging, or other suitable identifier. If the payment transaction did not originate at a qualified merchant, the process can loop forward to block 416 to resume standard processing. If the payment transaction did originate at a qualified merchant, the consumer loyalty server can determine at block 412 if the transaction satisfies a rule. The rule can be, for example, a loyalty-based rule defined by the merchant that is based on the consumer's present or historical purchase activity. Satisfaction of the rule can, for example, result in the incrementing of a variable or the triggering of a benefit to be applied to the transaction or a future transaction. The rule can be a function of any suitable transaction aspect or combination of aspects, such as purchase amount, purchase date, purchase location, as well as a variety of other aspects of a consumer's interactions with a merchant. At block 414, the consumer loyalty server determines whether to apply a benefit to the transaction. If no benefit is to be applied, the process can loop forward to block 416 to complete the standard processing. If a benefit is to be applied, modifications can be made to the transaction messaging (such as a reduction in the authorization request amount), as may be need to provide the consumer with the benefit. The process can then proceed to block 416 to process the transaction.

FIGS. 5-8 schematically depict various simplified ledger schemas in accordance with non-limiting embodiments. Referring first to FIG. 5, a ledger 500 is a simplified representation of the ledger 146 depicted in FIG. 2A, for example. The ledger 500 includes a plurality of ledger IDs 510. Each ledger ID 510 can be linked to one or more payment vehicles or otherwise linked to a consumer or group of consumers. In this embodiment, each ledger ID is also associated with a stored value amount 550, as may be resident in a convention prepaid tracking system. The ledger 500 also includes, however, a programless loyalty extension 580. The programless loyalty extension 580 can include any suitable schema for tracking loyalty-based behavior for one or more merchants or other entities. In the illustrated embodiment, the programless loyalty extension 580 includes loyalty-based data for three merchants, as indicated by MID 1, MID 2, and MID 3. Each merchant section 560 can comprises rules 562, variables 564, and stored benefits 566. As shown, some merchants have more rules and variables than others. In any event, data maintained in the programless loyalty extension 580 can be updated over time based on a particular consumer's interaction with each of the merchants 560. Additionally, stored benefits 566 can be selectively applied to various transactions in accordance with the loyalty plan of merchants identified in the programless loyalty extension 580.

Referring now to FIG. 6, ledgers 600, 602 are simplified representations of the ledger 146 and a ledger of the prepaid system 122, as depicted in FIG. 2A, for example. The ledger 600 includes a plurality of ledger IDs 610. Each ledger ID 610 can be linked to one or more payment vehicles or otherwise linked to a consumer or group of consumers. The ledger 600 includes loyalty-based data for two merchants, as indicated by MID 1 and MID 2. Each merchant section 660 can comprises rules 662 and variables 664. The stored benefits associated with the various rules, merchants, or variables can be stored as stored benefits 668 of ledger 602. Ledger 602 also includes a plurality ledger IDs 620. Each ledger ID in ledger 602 is also associated with a stored value amount 666, as may be resident in a convention prepaid tracking system, and a stored benefit amount 668. Thus, in this embodiment, the ledger 602 can generally be a prepaid ledger that has been extended to function as a repository for stored benefits which can be selectively applied to various transactions.

Figure 7:
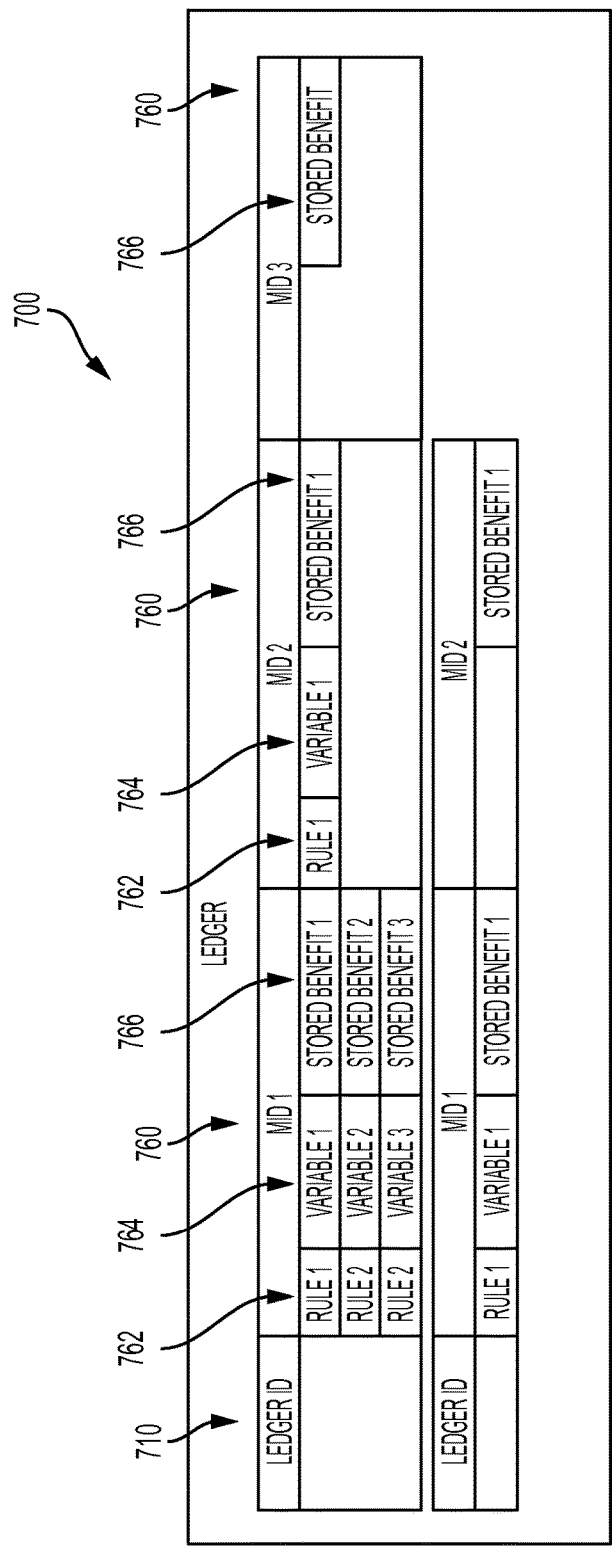

Referring now to FIG. 7, a ledger 700 is simplified representation of the ledger 146 depicted in FIG. 2C, for example. The ledger 700 includes a plurality of ledger IDs 710. Each ledger ID 710 can be linked to one or more payment vehicles or otherwise linked to a consumer or group of consumers. The ledger 700 includes loyalty-based data for three merchants, as indicated by MID 1, MID 2, and MID 3. Each merchant section 760 can comprises rules 762, variables 764, and stored benefits 766. As shown, some merchants have more rules and variables than others. In any event, data maintained for each merchant can be updated over time based on a particular consumer's interaction with each of the merchants 760. Additionally, stored benefits 766 can be selectively applied to various transactions in accordance with the loyalty plan of merchants identified in the programless loyalty extension 780.

Figure 8:
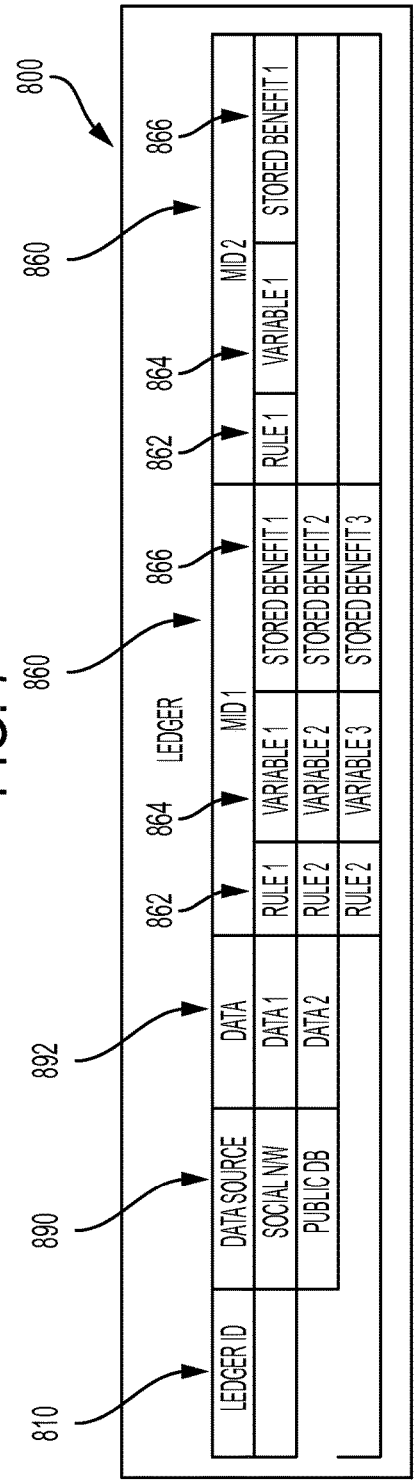

In accordance with the present disclosure, any of the ledgers described herein can store and/or track a wide range of data regarding consumer-based activity to further enrich the marketing experience that can be ultimately be delivered to the consumer. Referring now to FIG. 8, a simplified representation of the ledger 800 configured to store additional consumer-based data is depicted. Similar to other embodiments, the ledger 800 includes a plurality of ledger IDs 810. Each ledger ID 810 can be linked to one or more consumers. The ledger 800 includes loyalty-based data for two merchants, as indicated by MID 1 and MID 2. Associated with each ledger ID 810 is a data source 890 and data section 892. In the illustrated embodiment, social network data is maintained as well as other data retrieved from public databases. It is to be appreciated that a wide variety of data from a wide variety of data sources can be stored in the ledger 800 This data can be utilized by the rules 862, for example, to further customize or otherwise enhance the marketing experience for the consumer. In some embodiments, a consumer loyalty server can analyze the data tracked by the ledger 800 and recommend various stored benefits or other marketing efforts to certain consumers or segmentations of consumers. Consumer response to such activities can be tracked in the ledger 800, or elsewhere as may be desired, to further increase the success and value of such marketing efforts.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. One or more non-transitory machine-readable storage media comprising a plurality of instructions stored thereon that in response to being executed by a consumer loyalty server, cause the consumer loyalty server to:
   store identifying indicia of a consumer in association with a ledger identifier;
   receive a merchant rule for applying a stored benefit to a purchase transaction originating at a merchant website, the merchant rule defining a benefit to be applied if one or more conditions of online consumer behavior are met, and the merchant website being associated with a merchant identifier;
   generate a table storing the merchant rule in association with the merchant identifier and the ledger identifier;
   monitor online behavior of a consumer by determining at least one or more of: a total time spent at the merchant website by the consumer and a total number of visits to the merchant website by the consumer;
   determine an internet protocol (IP) address or a media access control (MAC) address of the monitored consumer;
   determine that the monitored consumer is the consumer associated with the ledger identifier by matching the IP address or the MAC address to the identifying indicia;
   receive an authorization request for a first transaction amount, the authorization request comprising the first transaction amount, a merchant identification number (MID), an account number, and an IP identifier or a MAC identifier;
   determine that the authorization request is from the merchant website associated with the merchant identifier by matching the MID to the merchant identifier;
   determine that the authorization request is initiated by the consumer associated with the ledger identifier based on comparing the IP identifier, the MAC identifier, or the account number against the identifying indicia;
   in response to determining that the authorization request is from the merchant website associated with the merchant identifier and is initiated by the consumer associated with the ledger identifier, query the table using the ledger identifier and the merchant identifier to identify the merchant rule;
   determine if the one or more conditions of online consumer behavior are met based on the monitored online behavior of the consumer;
   in response to the one or more conditions of online consumer behavior being met, cause the application of the stored benefit to the authorization request and the transmission of an authorization request to an issuing processor for a second transaction amount; and
   in response to the one or more conditions of online consumer behavior being not met, cause the transmission of an authorization request to an issuing processor for the first transaction amount.

2. The one or more machine-readable storage media of claim 1, wherein the merchant rule defines a purchase-related online activity that upon completion of the purchase-related online activity by a consumer the stored benefit is applied to the authorization request.

3. The one or more machine-readable storage media of claim 2, wherein the stored benefit is one or more of a discount, a promotional offering and a coupon.

4. The one or more machine-readable storage media of claim 1, wherein when the one or more conditions of online consumer behavior are not met, a variable stored in the table is updated based on the authorization request.

5. The one or more machine-readable storage media of claim 4, wherein the variable tracks purchase-related online activity of the consumer over time, and wherein the merchant rule is based on the value of the variable.

6. The one or more machine-readable storage media of claim 1, wherein querying the table using the ledger identifier and the merchant identifier to identify the merchant rule comprises determining if the consumer is associated with the merchant rule.

7. The one or more machine-readable storage media of claim 6, wherein the consumer is associated with merchant rules for each of a plurality of merchants.

8. The one or more machine-readable storage media of claim 1, wherein the identifying indicia comprise one or more of an account number, an email address, an IP address, and a MAC address.

9. A method of consumer loyalty, the method comprising:
storing, by a consumer loyalty server, identifying indicia of a consumer in association with a ledger identifier;
receiving, by the consumer loyalty server, a merchant rule for applying a stored benefit to a purchase transaction originating at a merchant website, the merchant rule defining a benefit to be applied if one or more conditions of online consumer behavior are met, and the merchant website being associated with a merchant identifier;
generating, by the consumer loyalty server, a table storing the merchant rule in association with the merchant identifier and the ledger identifier;
monitoring, by the consumer loyalty server, online behavior of a consumer by determining at least one or more of: a total time spent at the merchant website by the consumer and a total number of visits to the merchant website by the consumer;
determining, by the consumer loyalty server, an internet protocol (IP) address or a media access control (MAC) address of the monitored consumer;
determining, by the consumer loyalty server, that the monitored consumer is the consumer associated with the ledger identifier by matching the IP address or the MAC address to the identifying indicia;
receiving, by the consumer loyalty server, an authorization request for a first transaction amount, the authorization request comprising the first transaction amount, a merchant identification number (MID), an account number, and an IP identifier or a MAC identifier;
determining, by the consumer loyalty server, that the authorization request is from the merchant website associated with the merchant identifier by matching the MID to the merchant identifier;
determining, by the consumer loyalty server, that the authorization request is initiated by the consumer associated with the ledger identifier based on comparing the IP identifier, the MAC identifier, or the account number against the identifying indicia;
in response to determining that the authorization request is from the merchant website associated with the merchant identifier and is initiated by the consumer associated with the ledger identifier, querying, by the consumer loyalty server, the table using the ledger identifier and the merchant identifier to identify the merchant rule;
determining, by the consumer loyalty server, if the one or more conditions of online consumer behavior are met based on the monitored online behavior of the consumer;
in response to the one or more conditions of online consumer behavior being are met, causing, by the consumer loyalty server, the application of the stored benefit to the authorization request and the transmission of an authorization request to an issuing processor for a second transaction amount, wherein the merchant rule is based at least in part on historical consumer data; and
in response to the one or more conditions of online consumer behavior being not met, causing, by the consumer loyalty server, the transmission of an authorization request to an issuing processor for the first transaction amount.

10. The method of claim 9, wherein the merchant rule defines a purchase-related online activity that upon completion of the purchase-related online activity by a consumer the stored benefit is applied to the authorization request.

11. The method of claim 10, wherein the stored benefit is one or more of a discount, a promotional offering and a coupon.

12. The method of claim 9, wherein the historical consumer data comprises any of purchase-related data and non-purchase-related data.

13. The method of claim 1, wherein querying the table using the ledger identifier and the merchant identifier to identify the merchant rule comprises determining if the consumer is associated with the merchant rule.

14. A consumer loyalty system, comprising:
a consumer loyalty server comprising a processor executing instructions stored in memory, wherein the instructions cause the processor to:
store identifying indicia of a consumer in association with a ledger identifier;
receive a merchant rule for applying a stored benefit to a purchase transaction originating at a merchant website, the merchant rule defining a benefit to be applied if one or more conditions of online consumer behavior are met, and the merchant website being associated with a merchant identifier;
generate a table storing the merchant rule in association with the merchant identifier and the ledger identifier;
monitor online behavior of a consumer by determining at least one or more of: a total time spent at the merchant website by the consumer and a total number of visits to the merchant website by the consumer;
determine an internet protocol (IP) address or a media access control (MAC) address of the monitored consumer;
determine that the monitored consumer is the consumer associated with the ledger identifier by matching the IP address or the MAC address to the identifying indicia;
receive an authorization request for a first transaction amount, the authorization request comprising the first transaction amount, a merchant identification number (MID), an account number, and an IP identifier or a MAC identifier;
determine that the authorization request is from the merchant website associated with the merchant identifier by matching the MID to the merchant identifier;
determine that the authorization request is initiated by the consumer associated with the ledger identifier based on comparing the IP identifier, the MAC identifier, or the account number against the identifying indicia;

in response to determining that the authorization request is from the merchant website associated with the merchant identifier and is initiated by the consumer associated with the ledger identifier, query the table using the ledger identifier and the merchant identifier to identify the merchant rule;

determine if the one or more conditions of online consumer behavior are met based on the monitored online behavior of the consumer;

in response to the one or more conditions of online consumer behavior being met, cause an acquirer processor the application of the stored benefit to the authorization request and the transmission of an authorization request to an issuing processor for a second transaction amount; and in response to the one or more conditions of online consumer behavior being not met, update a variable in the one or more databases to track purchase-related online activity of the consumer and cause the acquirer processor transmission of an authorization request to an issuing processor for the first transaction amount.

15. The consumer loyalty system of claim 14, wherein querying the one or more databases to determine if the authorization request satisfies the merchant rule comprises determining if the consumer is associated with the merchant rule.

16. The consumer loyalty system of claim 14, wherein the acquirer processor further comprises a prepaid system.

17. The consumer loyalty system of claim 16, wherein at least one of the one or more databases is maintained by the prepaid system.

18. The consumer loyalty system of claim 14, wherein the merchant rule defines a purchase-related online activity that upon completion of the purchase-related online activity by a consumer the stored benefit is applied to the authorization request.

19. The consumer loyalty system of claim 18, wherein the stored benefit is one or more of a discount, a promotional offering and a coupon.

\* \* \* \* \*